United States Patent
Zimmermann et al.

(10) Patent No.: US 11,332,112 B2
(45) Date of Patent: May 17, 2022

(54) BRAKE SYSTEM FOR A MOTOR VEHICLE AND TWO METHODS FOR OPERATING THE BRAKE SYSTEM

(71) Applicant: Continental Teves AG & Co. oHG, Frankfurt am Main (DE)

(72) Inventors: Jochen Zimmermann, Oberwallmenach (DE); Robert Grimm, Hofheim (DE); Jochen Beuss, Erzhausen (DE); Roland Caspari, Frankfurt am Main (DE)

(73) Assignee: Continental Teves AG & Co. oHG

( * ) Notice: Subject to any disclaimer, the term of this patent is extended or adjusted under 35 U.S.C. 154(b) by 159 days.

(21) Appl. No.: 16/474,630

(22) PCT Filed: Jan. 8, 2018

(86) PCT No.: PCT/EP2018/050327
§ 371 (c)(1),
(2) Date: Jun. 28, 2019

(87) PCT Pub. No.: WO2018/130483
PCT Pub. Date: Jul. 19, 2018

(65) Prior Publication Data
US 2019/0344769 A1    Nov. 14, 2019

(30) Foreign Application Priority Data

Jan. 11, 2017 (DE) .................... 10 2017 200 344.8
Dec. 12, 2017 (DE) .................... 10 2017 222 445.2

(51) Int. Cl.
*B60T 8/40* (2006.01)
*B60T 13/68* (2006.01)
(Continued)

(52) U.S. Cl.
CPC .......... *B60T 13/686* (2013.01); *B60T 13/168* (2013.01); *B60T 13/18* (2013.01); *B60T 13/58* (2013.01);
(Continued)

(58) Field of Classification Search
CPC .......... B60T 8/4081; B60T 8/17; B60T 8/326; B60T 8/404; B60T 8/4054; B60T 8/4072;
(Continued)

(56) References Cited

U.S. PATENT DOCUMENTS 5,676,435 A * 10/1997 Breitenbacher ....... B60T 8/1766
  303/155
2008/0258546 A1* 10/2008 Drumm ................. B60T 8/4077
  303/115.4
(Continued)

FOREIGN PATENT DOCUMENTS

DE          10319338 A1   11/2004
DE    102011084206 A1 *   4/2012  .............. B60T 7/042
(Continued)

OTHER PUBLICATIONS

Chinese Office Action with Search Report for Chinese Application No. 201880006370.2, dated Jan. 4, 2021, with partial English translation, 11 pages.
(Continued)

*Primary Examiner* — Robert A. Siconolfi
*Assistant Examiner* — Stephen M Bowes
(74) *Attorney, Agent, or Firm* — RatnerPrestia

(57) ABSTRACT

A brake system for a motor vehicle having hydraulically actuatable wheel brakes. Each wheel an electrically actuatable inlet valve and electrically actuatable outlet valve for setting wheel-specific brake pressures. A first electrically controllable pressure provision device is connected to a brake supply line to which the wheel brakes are connected. A second electrically controllable pressure provision device is connected to the brake supply line. A first electrical device activates the first pressure provision device. A second electrical device activates the second pressure provision device. Electrically independent first and second electrical partitions are provided. The first pressure provision device and the first electrical device are assigned to the first electrical partition and the second pressure provision device, the second electrical device and the inlet and outlet valves are assigned to the second electrical partition. The inlet and outlet valves are activated by the second electrical device.

15 Claims, 4 Drawing Sheets

(51) Int. Cl.
  *B60T 13/16* (2006.01)
  *B60T 13/18* (2006.01)
  *B60T 13/58* (2006.01)
  *B60T 15/02* (2006.01)
(52) U.S. Cl.
  CPC ......... *B60T 15/028* (2013.01); *B60T 2240/00* (2013.01); *B60T 2250/00* (2013.01); *B60T 2270/402* (2013.01); *B60T 2270/403* (2013.01)
(58) Field of Classification Search
  CPC ...... B60T 8/4266; B60T 8/4013; B60T 7/042; B60T 13/745; B60T 13/686; B60T 2270/82; B60T 2270/404; B60T 2270/413
  See application file for complete search history.

(56) References Cited

U.S. PATENT DOCUMENTS

| | | | | |
|---|---|---|---|---|
| 2008/0296106 | A1* | 12/2008 | Nilsson | B60T 8/885 188/156 |
| 2011/0316327 | A1 | 12/2011 | Rekow et al. | |
| 2014/0152085 | A1* | 6/2014 | Biller | B60T 8/441 303/10 |
| 2015/0274143 | A1* | 10/2015 | Miyazaki | B60T 7/042 303/9.61 |
| 2016/0009267 | A1* | 1/2016 | Lesinski, Jr. | B60T 7/12 303/10 |
| 2016/0082937 | A1* | 3/2016 | Nakaoka | B60T 7/042 303/15 |
| 2016/0325719 | A1* | 11/2016 | Linhoff | B60T 8/92 |
| 2017/0129468 | A1* | 5/2017 | Besier | B60T 8/4077 |
| 2019/0241167 | A1* | 8/2019 | Peichl | B60T 8/4081 |
| 2020/0276963 | A1* | 9/2020 | Zimmermann | B60T 13/686 |

FOREIGN PATENT DOCUMENTS

| | | |
|---|---|---|
| DE | 102012210809 A1 | 1/2013 |
| DE | 102013217954 A1 | 3/2015 |
| JP | 2005132306 A * | 5/2005 |
| WO | 2012143312 A1 | 10/2012 |
| WO | 2016000865 A1 | 1/2016 |

OTHER PUBLICATIONS

German Search Report for German Application No. 10 2017 222 445.2, with partial translation, dated Sep. 27, 2018—10 pages.
International Search Report and Written Opinion for International Application No. PCT/EP2018/050327, dated Mar. 27, 2018—12 pages.
Korean Decision for Grant of Patent for Korean Application No. 10-2019-7021916, dated Mar. 24, 2021, with translation, 3 pages.
Chinese Office Action for Chinese Application No. 201880006370.2, dated Aug. 19, 2021, with translation, 17 pages.

\* cited by examiner

BRAKE SYSTEM FOR A MOTOR VEHICLE AND TWO METHODS FOR OPERATING THE BRAKE SYSTEM

CROSS REFERENCE TO RELATED APPLICATIONS

This application is the U.S. National Phase Application of PCT International Application No. PCT/EP2018/050327, filed Jan. 8, 2018, which claims priority to German Patent Application No. 10 2017 222 445.2, filed Dec. 12, 2017, and German Patent Application No. 10 2017 200 344.8, filed Jan. 11, 2017, the contents of such applications being incorporated by reference herein.

FIELD OF THE INVENTION

The invention relates to a brake system for a motor vehicle, and to a method for the operation thereof.

BACKGROUND OF THE INVENTION

DE 10 2013 217 954 A1, which is incorporated herein by reference, has disclosed a brake system with two electrically controllable pressure sources and with a master brake cylinder for a motor vehicle with four hydraulically actuatable wheel brakes. The brake system comprises not only wheel-specific inlet and outlet valves but also a circuit separation valve and four separation valves for separating the master brake cylinder and the electrically controllable pressure sources from the inlet valves. The circuit separation valve, in its separation position, separates the brake system into two brake circuits, wherein the two front-wheel brakes are assigned to the first brake circuit and the two rear-wheel brakes are assigned to the second brake circuit. In the first brake circuit, brake pressure is built up exclusively by the first pressure source, and in the second brake circuit, brake pressure is built up exclusively by the second pressure source. The brake system furthermore comprises a central open-loop and closed-loop control unit, a first open-loop and closed-loop control unit assigned to the first pressure source, and a second open-loop and closed-loop control unit assigned to the second pressure source. The first and second open-loop and closed-loop control units serve in each case for the activation of the corresponding pressure source. The circuit separation valve is actuated by means of the central open-loop and closed-loop control unit. Further details regarding which of the three open-loop and closed-loop control units actuates or activates the other valves are not disclosed in DE 10 2013 217 954 A1. Also, the document does not mention how the electrical assignment and electrical energy supply of the three open-loop and closed-loop control units and the components assigned thereto is implemented.

SUMMARY OF THE INVENTION

An aspect of the present invention aims to provide a brake system which is suitable for highly automated driving, and a method for operating said brake system, which brake system is of simple and thus inexpensive construction but offers the extremely high availability required for highly automated driving.

An aspect of the invention is based on the concept of providing a brake system having hydraulically actuatable wheel brakes which are assigned to wheels of a first vehicle axle and wheels of a second vehicle axle, an electrically actuatable inlet valve and electrically actuatable outlet valve for each wheel brake, a first electrically controllable pressure provision device which is connected to a brake supply line to which the wheel brakes are connected, a second electrically controllable pressure provision device which is connected to the brake supply line, a first electrical device with electrical and/or electronic elements, which activates the first pressure provision device, and a second electrical device with electrical and/or electronic elements, which activates the second pressure provision device. Here, a first electrical partition and a second electrical partition are provided in the brake system, wherein the first and the second electrical partition are electrically independent of one another. The first pressure provision device and the first electrical device are assigned or belong to the first electrical partition and the second pressure provision device, the second electrical device and the inlet and outlet valves are assigned or belong to the second electrical partition. The inlet and outlet valves are activated by the second electrical device.

Thus, the first electrical device and the second electrical device are also electrically independent of one another.

An aspect of the invention offers the advantage that the brake system has high availability with regard to the provision of brake functions in which all wheel brakes are actuated, possibly with different wheel brake pressures, in order to ensure, for example, a short braking distance and to maintain steerability of the motor vehicle. Thus, in a fault-free state of the brake system, wheel-specific wheel brake pressures can be set by virtue of the first electrical device providing a (central) brake pressure by means of the first pressure provision device, and the second electrical device modulating the wheel-specific wheel brake pressures by means of the inlet and outlet valves. However, even in the event of a failure in the first electrical partition, that is to say for example a failure of the first pressure provision device or of the first electrical device, wheel-specific wheel brake pressures can be set by virtue of the second electrical device performing a braking operation with wheel-specific wheel brake pressures by means of the second pressure provision device and the inlet and outlet valves.

It is preferable for the first pressure provision device to be activated exclusively by the first electrical device, and for the second pressure provision device and the inlet and outlet valve to be activated exclusively by the second electrical device. It is thus possible to dispense with further redundancy in the components, for example doubly activatable valves with two independent valve coils or a pressure provision device with two electrically independent electric motors.

The brake system preferably comprises at least one electrically actuatable axle separation valve which is arranged hydraulically in the brake supply line between (at one side) the wheel brakes for the wheels of the first vehicle axle and (at the other side) the wheel brakes for the wheels of the second vehicle axle, wherein the axle separation valve belongs or is assigned to the first electrical partition and is activated by the first electrical device. Thus, even in the event of a failure in the second electrical partition, for example a failure of the second pressure provision device or of the second electrical device, the locking sequence of the axles and steerability can be maintained because a braking operation with wheel-specific wheel brake pressures can be performed by the first electrical device by means of the first pressure provision device and the axle separation valve.

To be able to dispense with a doubly activatable valve and further activation lines, the axle separation valve is activated preferably exclusively by the first electrical device.

The axle separation valve is preferably arranged such that, when the axle separation valve is closed, the brake supply line is hydraulically separated into a first line portion and a second line portion, wherein the first line portion is connected to the second pressure provision device and to the inlet valves of the wheel brakes of the rear axle of the motor vehicle, and the second line portion is connected to the first pressure provision device and to the inlet valves of the wheel brakes of the front axle of the motor vehicle. Thus, in the event of a failure in the second electrical partition, the axle brake pressure at the rear axle can be kept constant, and that at the front axle can be modulated, by means of the first electrical device.

The axle separation valve is preferably of normally-open design, such that the axle separation valve does not have to be activated for the actuation of the/all of the wheel brakes by means of one of the pressure provision devices.

According to one refinement of the brake system according to an aspect of the invention, a second axle separation valve is connected hydraulically in parallel with respect to the axle separation valve, wherein the second axle separation valve belongs or is assigned to the second electrical partition and is activated by the second electrical device. To reduce costs and redundancy, the second axle separation valve is particularly preferably activated exclusively by the second electrical device. It is particularly preferable if the axle separation valve and the second axle separation valve are of normally-closed design.

Preferably, the first electrical device is supplied by a first electrical energy source and the second electrical device is supplied by a second electrical energy source, which is independent of the first electrical energy source. The first energy source is thus part of the first electrical partition, and the second energy source is part of the second electrical partition. Advantageously, the first electrical energy source supplies the first electrical partition or all other electrical components of the first electrical partition with electrical energy, and the second electrical energy source supplies the second electrical partition or all other electrical components of the second electrical partition with electrical energy.

Preferably, a first wheel speed sensor is provided for each of the wheel brakes, wherein the first wheel speed sensors belong or are assigned to the second electrical partition and are connected to the second electrical device and are evaluated by the latter. Thus, the second electrical device can set the wheel-specific brake pressures in accordance with the situation. To reduce costs and redundancy (for example connecting lines), the first wheel speed sensors are particularly preferably connected exclusively to the second electrical device and are evaluated by the latter.

Preferably, a first driving dynamics sensor system is provided, which belongs or is assigned to the first electrical partition and which is connected to the first electrical device and is evaluated by the latter. Thus, the first electrical device can set the axle-specific brake pressures in accordance with the situation. To reduce costs and redundancy (for example connecting lines), the first driving dynamics sensor system is particularly preferably connected exclusively to the first electrical device and evaluated by the latter.

In one refinement of an aspect of the invention, a second wheel speed sensor is provided for each of the wheel brakes, wherein the second wheel speed sensors belong or are assigned to the first electrical partition and are connected, in particular exclusively, to the first electrical device and are evaluated by the latter, in order to increase the quality of the control of the axle-specific brake pressures. To reduce costs and redundancy (for example connecting lines), the second wheel speed sensors are particularly preferably connected exclusively to the first electrical device and are evaluated by the latter.

In order to increase the quality of the control of the wheel-specific brake pressures and to be able to carry out driving dynamics control functions (by means of the second partition), a second driving dynamics sensor system is preferably provided, which belongs or is assigned to the second electrical partition and which is connected to the second electrical device and is evaluated by the latter. To reduce costs and redundancy (for example connecting lines), the second driving dynamics sensor system is particularly preferably connected exclusively to the second electrical device and evaluated by the latter.

Preferably, the first pressure provision device is connected to the brake supply line via a first separation valve, wherein the first separation valve belongs or is assigned to the first electrical partition and is activated, advantageously exclusively, by the first electrical device.

The second pressure provision device is preferably connected to the brake supply line via a second separation valve, wherein the second separation valve belongs or is assigned to the first electrical partition and is activated, advantageously exclusively, by the first electrical device. The second pressure provision device can thus be hydraulically isolated, for example in the event of a leak in the region of the second pressure provision device.

In order to be able to use different types of pressure provision devices, a normally-open overflow valve, which is advantageously controllable in analog fashion, is preferably provided for the adjustment or control of the pressure provided by the second pressure provision device. Said overflow valve is assigned or belongs to the second electrical partition and is activated by the second electrical device. The overflow valve is advantageously activated exclusively by the second electrical device.

In one refinement of an aspect of the invention, the second pressure provision device is formed by a piston pump, advantageously a radial piston pump, with a suction port and a pressure port, wherein the pressure port is hydraulically connected via the overflow valve to the suction port. The overflow valve is thus connected in parallel with respect to the second pressure provision device.

The first pressure provision device is preferably formed by a cylinder-piston arrangement with a hydraulic pressure chamber, the piston of which is advanced for a build-up of brake pressure, and is retracted for a dissipation of brake pressure, by an electromechanical actuator.

The brake system preferably comprises a brake pedal and a simulation device. The simulation device imparts a pleasant brake pedal feel to the driver.

The brake system preferably comprises a pressure medium reservoir which is under atmospheric pressure.

The brake system preferably comprises at least four hydraulically actuatable wheel brakes.

The brake system preferably comprises, for each wheel brake, an inlet valve and an outlet valve for the setting of wheel-specific brake pressures, which are derived from the brake supply pressure in the brake supply line, wherein, in the non-activated state, the inlet valves conduct the brake supply pressure to the wheel brakes, and the outlet valves block an outflow of pressure medium from the wheel brakes.

It is particularly preferable for all of the outlet valves to be connected via a common hydraulic connection to the pressure medium reservoir which is under atmospheric pressure.

An aspect of the invention also relates to a method for operating a brake system according to the invention.

In a fault-free state of the brake system, the first electrical device performs an actuation of the wheel brakes by means of the first pressure provision device, wherein the second electrical device sets wheel-specific wheel brake pressures by means of the inlet and outlet valves.

Preferably, in the event of a failure in the first electrical partition, for example a failure of the first pressure provision device or of the first electrical energy source or of the first electrical device, the second electrical device performs a braking operation with wheel-specific wheel brake pressures by means of the second pressure provision device and the inlet and outlet valves.

In the event of a failure in the second electrical partition, for example a failure of the second pressure provision device or of the second electrical energy source or of the second electrical device, preferably the first electrical device performs a braking operation with axle-specific wheel brake pressures by means of the first pressure provision device and the axle separation valve.

Here, in order to maintain the steerability and the stability of the motor vehicle, the axle brake pressure at the rear axle is particularly preferably kept constant, whilst the axle brake pressure at the front axle is modulated.

An aspect of the invention offers the advantage that, even in the event of a failure of one of the two redundant electrical pressure provision devices, for example owing to a failure of the electrical energy source assigned thereto or of the electrical activation device assigned thereto or a mechanical fault or a leak in the pressure provision device itself, the brake system can maintain the most important residual braking functions, but at the same time the number of components of redundant design is as low as possible. Thus, neither the sensors nor the wheel pressure control valves (inlet and outlet valves) have to be of redundant design.

The brake system according to an aspect of the invention is therefore particularly suitable for the realization of highly automated driving functions.

BRIEF DESCRIPTION OF THE DRAWINGS

Further preferred embodiments of aspects of the invention will emerge from the subclaims and the following description with reference to figures.

In the figures, in each case schematically.

Identical parts are denoted by the same reference designations in all of the figures.

DETAILED DESCRIPTION OF THE PREFERRED EMBODIMENTS

Figure 1:
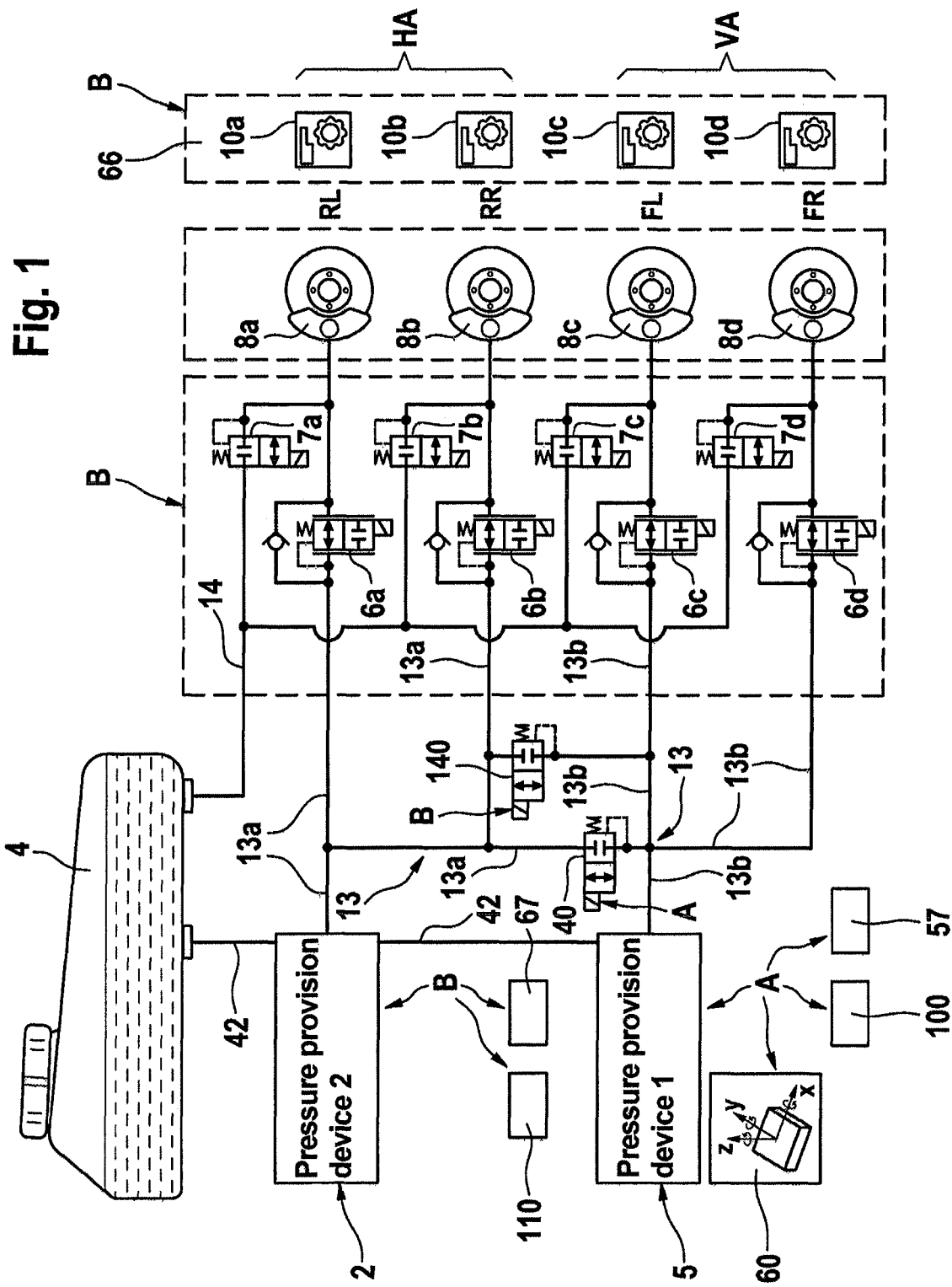
FIG. 1 shows a first exemplary embodiment of a brake system according to an aspect of the invention.

FIG. 1 illustrates, in highly schematic form, a first exemplary embodiment of a brake system according to an aspect of the invention for a motor vehicle having four hydraulically actuatable wheel brakes 8a-8d. By way of example, the wheel brake 8a is assigned to the left rear wheel (RL), the wheel brake 8b is assigned to the right rear wheel (RR), the wheel brake 8c is assigned to the left front wheel (FL), and the wheel brake 8d is assigned to the right front wheel (FR). The wheel brakes 8a, 8b are thus assigned to the rear axle HA and the wheel brakes 8c, 8d are assigned to the front axle VA. Other assignments of the wheel brakes 8a-8d to the wheels (FL, FR, RL, RR) are conceivable, but a "black-and-white" division is particularly advantageous, as will be explained below.

The brake system comprises a first electrically controllable pressure provision device 5, which constitutes the primary pressure actuator or the primary pressure source of the brake system, a second electrically controllable pressure provision device 2, which constitutes the secondary pressure actuator of the brake system, a pressure medium reservoir 4 which is under atmospheric pressure, and wheel-specific brake pressure modulation valves, which are designed as one inlet valve 6a-6d and one outlet valve 7a-7d per wheel brake.

Figure 3:
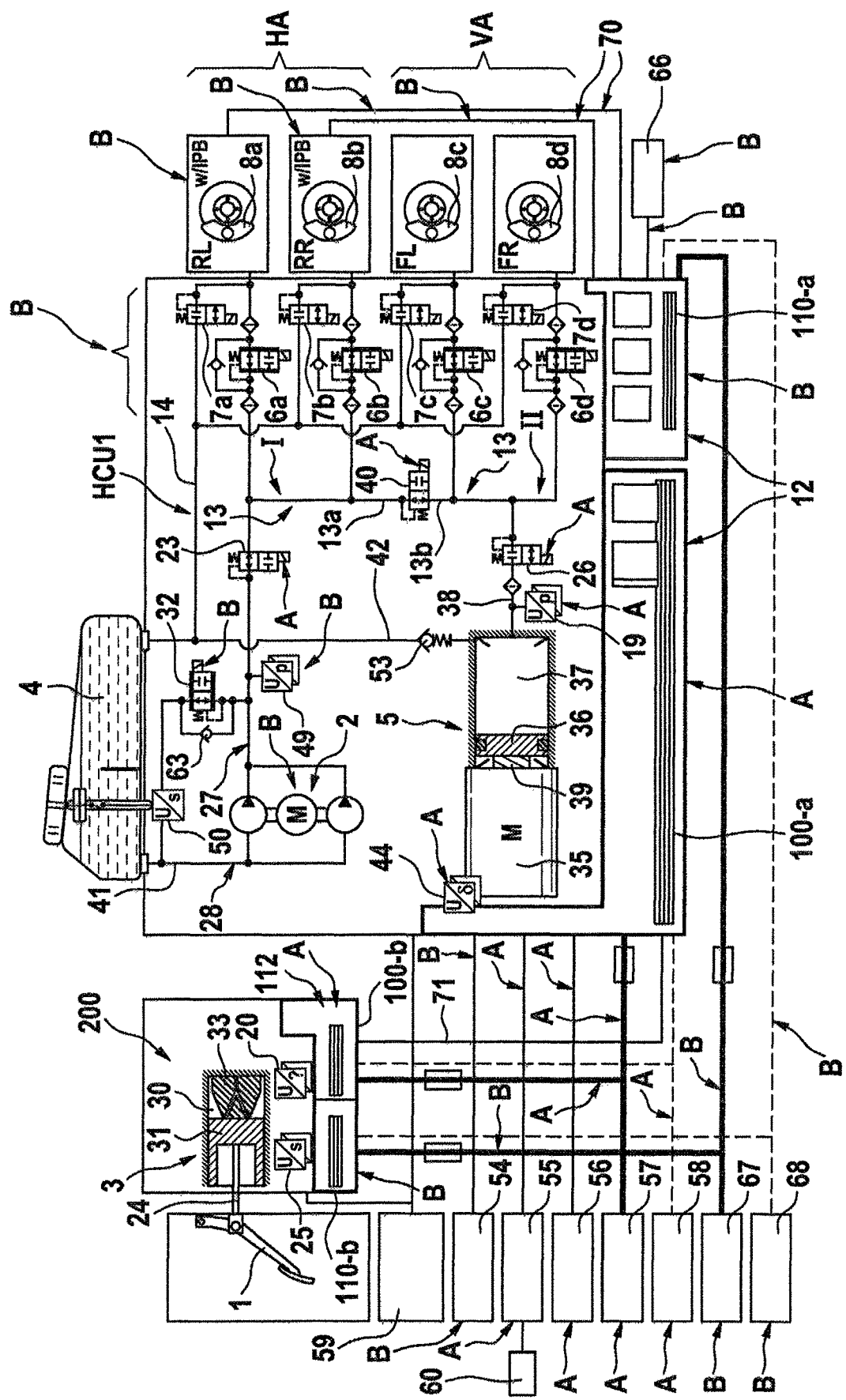
FIG. 3 shows a third exemplary embodiment of a brake system according to an aspect of the invention.

The two pressure provision devices 2 and 5 may be of identical or similar construction, for example as two linear actuators such as the pressure provision device 5 of FIG. 3. Alternatively, it is also possible for two different types of pressure provision devices to be used, such as, for example in FIG. 3, a linear actuator as in the case of pressure provision devices 5 and a radial piston pump as in the case of pressure provision devices 2.

The first electrically controllable pressure provision device 5 is connected to a line portion 13b of a brake supply line 13. Via the brake supply line 13, all of the input ports of the inlet valves 6a-6d are connected to one another. Correspondingly, all of the input ports of the inlet valves 6a-6d are also connected to the first pressure provision device 5.

The second electrically controllable pressure provision device 2 is connected to a line portion 13a of the brake supply line 13, such that the input ports of the inlet valves 6a-6d are also connected to the second pressure provision device 2.

In the example, a parallel circuit of a (first) electrically actuatable axle separation valve 40 and of a further (second) electrically actuatable axle separation valve 140 is arranged in the brake supply line 13, as it were between the line portions 13a and 13b. The parallel circuit is arranged such that, when the axle separation valves 40, 140 are closed, the brake supply line 13 is hydraulically separated into the first line portion 13a and the second line portion 13b, wherein the first line portion 13a is connected to the second pressure provision device 2 and to the inlet valves 6a, 6b of the wheel brakes 8a, 8b of the rear axle HA of the motor vehicle, and the second line portion 13b is connected to the first pressure provision device 5 and to the inlet valves 6c, 6d of the wheel brakes 8c, 8d of the front axle VA of the motor vehicle. The two axle separation valves 40, 140 are advantageously of normally-closed design.

Alternatively (see also FIG. 3), a (single) axle separation valve 40 is arranged in the brake supply line 13, which axle separation valve is arranged such that, when the axle separation valve 40 is closed, the brake supply line 13 is hydraulically separated into the first line portion 13a and the second line portion 13b, wherein the first line portion 13a is connected to the second pressure provision device 2 and to the inlet valves 6a, 6b of the wheel brakes 8a, 8b of the rear axle HA of the motor vehicle, and the second line portion 13b is connected to the first pressure provision device 5 and to the inlet valves 6c, 6d of the wheel brakes 8c, 8d of the front axle VA of the motor vehicle. The axle separation valve 40 is advantageously of normally-open design.

In both cases, the brake supply line 13 can be separated by means of the one or more axle separation valves into the first line portion 13a, which connects the second pressure provision device 2 to the wheel brakes 8a, 8b of the rear axle, and the second line portion 13b, which connects the first pressure provision device 5 to the wheel brakes 8c, 8d of the front axle. When the axle separation valves 40, 140 are closed, or when the axle separation valve 40 is closed, the brake system is separated or divided into two hydraulic (axle) brake circuits I and II. Here, in the first brake circuit I, the pressure provision device 2 is connected to only the wheel brakes 8a and 8b of the rear axle HA, and in the second brake circuit II, the first pressure provision device 5 is connected to only the wheel brakes 8c and 8d of the front axle VA. An arrangement such that, in the first brake circuit I, the pressure provision device 2 is connected to only the wheel brakes of the front axle VA and, in the second brake circuit II, the first pressure provision device 5 is connected to only the wheel brakes of the rear axle HA, is also conceivable.

Advantageously, the first pressure provision device 5 connected to the front axle wheel brakes 8c, 8d is a high-performance pressure actuator that realizes the normal brake function with an extremely high level of comfort and extremely high dynamics in the fault-free brake system.

As already mentioned, the brake system comprises, for each hydraulically actuatable wheel brake 8a-8d, an inlet valve 6a-6d and an outlet valve 7a-7d which are hydraulically interconnected in pairs via central ports and are connected to the wheel brake 8a-8d. Connected in parallel with respect to each of the inlet valves 6a-6d is a check valve (not designated specifically) which opens in the direction of the brake supply line 13. The output ports of the outlet valves 7a-7d are connected to the pressure medium reservoir 4 via a common return line 14. The input ports of all inlet valves 6a-6d can be supplied via the brake supply line 13 (that is to say when the axle separation valve 40 or 140 is open) with a pressure which is provided by the first pressure provision device 5 or, for example in the event of a failure of the first pressure provision device 5, by the second pressure provision device 2.

The pressure provision devices 2 and 5 are connected to the pressure medium reservoir 4 for the replenishment or intake of pressure medium, which is indicated for example by a common replenishment line 42. Switchable valves or check valves that may be necessary or expedient are not illustrated in detail in FIGS. 1 and 2.

Each wheel RL, RR, FL, FR is assigned a wheel speed sensor 10a-10d. The wheel speed sensors 10a-10d, which are denoted as a group by the reference designation 66, are required for brake pressure control functions with wheel-specific (wheel) brake pressures, for example for anti-lock control functions (ABS).

Furthermore, in the example, the brake system is connected to, or comprises, a driving dynamics sensor system 60. The driving dynamics sensor system 60 comprises at least one measuring device for detecting one or more of the following variables:
- longitudinal acceleration, in particular vehicle longitudinal acceleration;
- lateral acceleration, in particular vehicle lateral acceleration;
- yaw rate;
- steering angle.

For the electrical attachment, connection and supply of the individual electrical or electrically actuatable, activatable, evaluatable or similar components of the brake system, a first electrical partition A and a second electrical partition B are provided, which are electrically independent of one another.

In the figures, those electrical components which are assigned or belong to the first electrical partition A are indicated by an arrow A, while those electrical components which are assigned or belong to the second electrical partition B are indicated by an arrow B.

The brake system comprises a first electrical device 100 with electrical and/or electronic elements (for example microcontrollers, power components, valve drivers, other electronic components, etc.), which first electrical device is assigned or belongs to the first electrical partition A, and a second electrical device 110 with electrical and/or electronic elements (for example microcontrollers, power components, valve drivers, other electronic components, etc.), which second electrical device is assigned or belongs to the second electrical partition B. Thus, the first electrical device and the second electrical device are also electrically independent of one another.

The first electrical device 100 activates the first pressure provision device 5. Correspondingly, the first pressure provision device 5 is assigned or belongs to the first electrical partition A.

The second electrical device 110 activates the second pressure provision device 2. Correspondingly, the second pressure provision device 2 is assigned or belongs to the second electrical partition B.

In the example, the first pressure provision device 5 can be or is activated exclusively by the first electrical device 100, and the second pressure provision device 2 can be or is activated exclusively by the second electrical device 110. It would basically be conceivable for the electric motor of a pressure provision device to be equipped for example with two electrically independent motor coils; it would thus be possible for the pressure provision device to be activated by the two independent electrical devices. This would however be associated with further redundancies, for example double connecting lines, etc., and would thus be more expensive.

Other components of the brake system are advantageously assigned either to the first electronic device A (which activates or actuates the first pressure provision device 5) or to the second electronic device B (which activates or actuates the second pressure provision device 2). That is to say said components are activated or actuated by said device and/or supplied with electrical energy by said device, and/or are connected on the signal side to said device and/or are evaluated by said device. In order to avoid further redundancies, it is advantageously the case that a component is activatable or actuatable by, or suppliable with electrical energy by, or connected in signal-transmitting fashion to, or evaluatable by, only or exclusively one of the two electronic devices 100, 110, but not the other electronic device.

The inlet and outlet valves 6a-6d, 7a-7d are assigned to the second electrical partition B and are activated by the second electrical device 110. In the example, the inlet and outlet valves 6a-6d, 7a-7d are activated only by the second electrical device 110. It would basically be conceivable for a valve to be designed to be doubly activatable, for example with two electrically independent actuation coils. It would thus be possible for the valve to be activated by the two independent electrical devices. This would however be more expensive. Therefore, the wheel control valves 6a-6d, 7a-7d

(as is conventional) each have only one valve coil and are activated only by the second electrical device 110.

Likewise, the wheel speed sensors 10a-10d and 66 are assigned to the second electrical partition B. The signals of said wheel speed sensors are transmitted to the second electrical device 110 and are processed by the second electrical device 11Q. For cost reasons, the wheel speed sensors 10a-10d and 66 are connected on the signal side exclusively to the second electrical device 110 and are evaluated by the second electrical device 110. The wheel speed sensors 66 are advantageously supplied with electrical energy by means of the second electrical device 110.

By contrast, the axle separation valve 40 is assigned to the first electrical partition A and is activated by the first electrical device 100.

By contrast, the second axle separation valve 140 is assigned to the second electrical partition B and is activated by the second electrical device 110.

For cost reasons, the axle separation valve 40 is activated exclusively by the first electrical device 100, and the axle separation valve 140 is activated exclusively by the second electrical device 110.

The driving dynamics sensor system 60 is, like the first axle separation valve 40, assigned to the electrical partition A. The signals are transmitted to the first electrical device 100 and are evaluated and processed by the first electrical device 100. Advantageously, the driving dynamics sensor system 60 is also connected only to the first electrical device 100 on the signal side and is evaluated by the first electrical device 100. Advantageously, the driving dynamics sensor system 60 is supplied with electrical energy by means of the first electrical device 100.

The first electrical device 100 is supplied by a first electrical energy source or energy supply 57, for example a first vehicle electrical system, and the second electrical device 110 is supplied by a second electrical energy source or energy supply 67, for example a second vehicle electrical system. In this case, the second electrical energy source 67 is electrically independent of the first electrical energy source 57. The first energy source 57 is thus part of the first electrical partition A, and the second energy source 67 is part of the second electrical partition B.

Advantageously, the first electrical energy source or energy supply 57 supplies the first electrical partition A, that is to say all electrical components of the first electrical partition A, with electrical energy, whereas the second electrical energy source or energy supply 67 supplies the second electrical partition B, that is to say all electrical components of the second electrical partition B, with electrical energy.

By way of example and for the sake of simplicity, the first pressure provision device 5 is supplied with energy (from the first electrical energy source 57) via the first electrical device 100 and the second pressure provision device 2 is supplied with energy (from the second electrical energy source 67) via the second electrical device 110.

An electrical device 100, 110 is not necessarily understood to mean a spatial unit which is arranged, for example, in a housing. The electrical and/or electronic elements of an electrical device may be arranged separately from each other, for example in different electronic open-loop and closed-loop control units or housings. An electrical device forms a partition together with the electrical or electrically actuatable components activated by said electrical device as well as with the energy source which supplies the electrical device (and possibly the associated components) with electrical energy. This partition is an electrically independent unit.

The electrical and/or electronic elements of the first electrical device 100 and those of the second electrical device 110 are arranged, for example, on different printed circuit boards and are supplied by independent electrical energy sources 57 and 67.

Figure 2:
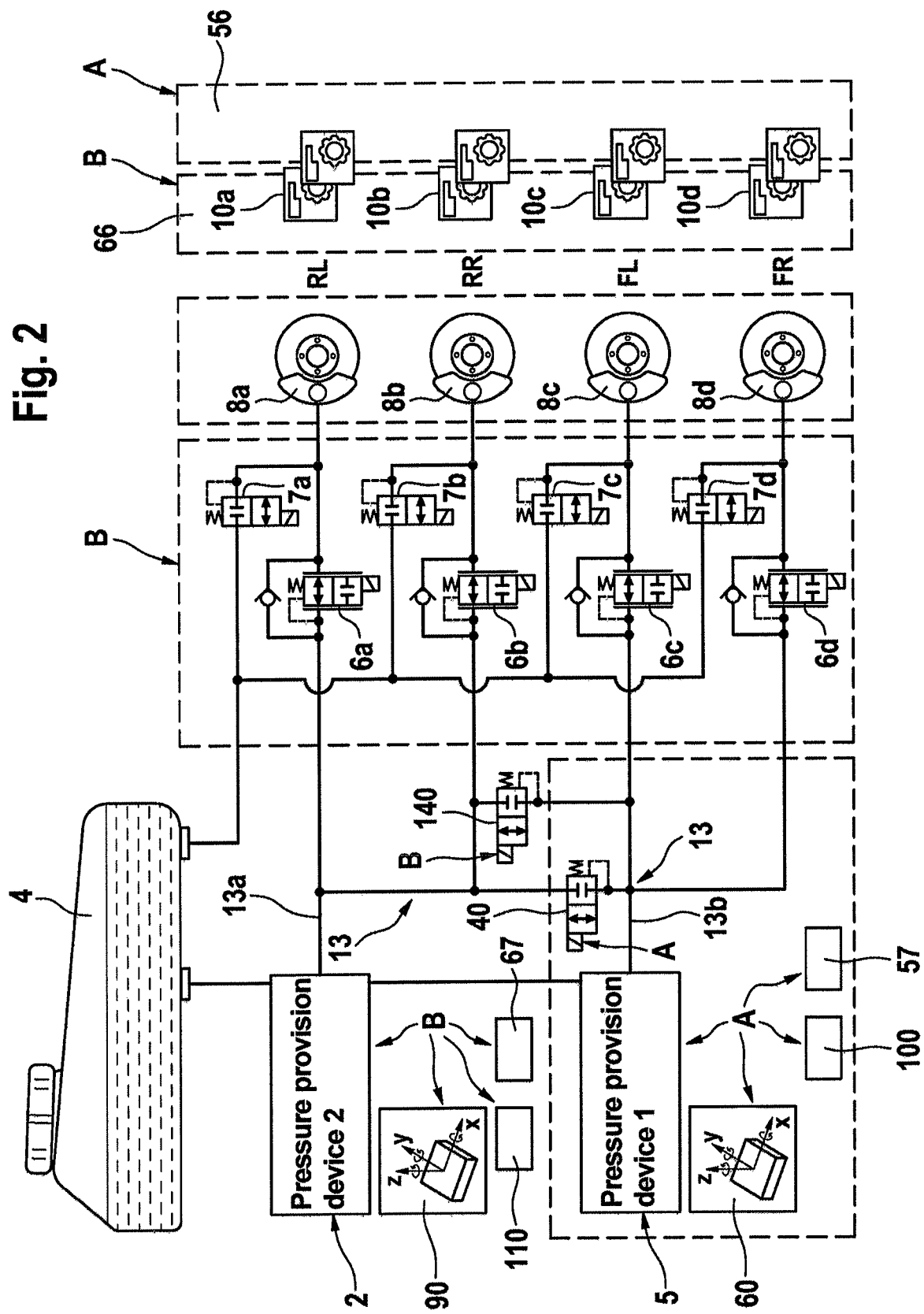
FIG. 2 shows a second exemplary embodiment of a brake system according to an aspect of the invention.

FIG. 2 shows a second exemplary embodiment of a brake system according to an aspect of the invention.

By contrast to the first exemplary embodiment of FIG. 1, an additional, second wheel speed sensor is provided for each wheel. The second wheel speed sensors 56 are assigned to the first electrical partition A. The signals of said wheel speed sensors are transmitted to the first electrical device 100 and are processed by the first electrical device 100. For cost reasons, the wheel speed sensors 56 are connected on the signal side exclusively to the first electrical device 100 and are evaluated by the first electrical device 100. The wheel speed sensors 56 are advantageously supplied with electrical energy by means of the first electrical device 100. The quality of the control of partition A can be increased by means of the second wheel speed sensors 56.

Furthermore, by contrast to the first exemplary embodiment, a second driving dynamics sensor system 90 is provided, which is assigned to the second electrical partition B. The signals of said driving dynamics sensor system are transmitted to the second electrical device 110 and are evaluated and processed by the second electrical device 110. Advantageously, the driving dynamics sensor system 90 is also connected only to the second electrical device 110 on the signal side and is evaluated by the second electrical device 110. Advantageously, the driving dynamics sensor system 90 is supplied with electrical energy by means of the second electrical device 110. By means of the second driving dynamics sensor system 90, the quality of the control of the partition B can be increased or, in addition to anti-lock control functions, driving dynamics control functions can also be performed.

Exemplary methods for operating the exemplary brake systems of FIGS. 1 and 2 will be described below:

a) Fault-free state of the brake system

Here, both partitions A and B are fault-free and fully functional, that is to say, for example, the two pressure provision devices 2, 5 and the two electrical devices 100, 110 and all valves.

A demanded brake pressure is provided by means of the first pressure provision device 5 (primary pressure actuator) by activation by means of the first electrical device 100. Thus, braking operations with all wheel brakes 8a-8d are possible (4-wheel braking).

Wheel-specific pressure control operations are possible by means of the inlet and outlet valves 6a-6d, 7a-7d, which are activated by the second electrical device 110.

b) Failure in partition A, for example failure of the first pressure provision device 5, the first electrical device 100 or the first energy source 57:

Since the second electrical device 110 activates the second pressure provision device 2 and the axle separation valve 140, it is possible, through activation of the pressure provision device 2 and opening of the axle separation valve 140, for the second pressure provision device 2 to be connected to all wheel brakes 8a-8d, and thus for brake pressure to be built up and also (jointly) controlled at all wheel brakes (4-wheel braking).

Wheel-specific pressure control operations, in particular anti-lock control operations, are also possible by means of the inlet and outlet valves 6a-6d, 7a-7d, because these are activated by the second electrical device 110, and the signals of the wheel speed sensors 66 are available to the second electrical device 110.

Thus, the second electrical partition B can, in a virtually unchanged manner in relation to that which is known, perform ABS control (ABS: anti-lock system) and realize all residual functions together with the possibility of building up brake pressure.

c) Failure in partition B, for example failure of the second pressure provision device 2, the second electrical device 110 or the second energy source 67:

Since the first electrical device 100 activates the first pressure provision device 5 and the axle separation valve 40, it is possible, through activation of the pressure provision device 5 and opening of the axle separation valve 40, for the first pressure provision device 5 to be connected to all wheel brakes 8a-8d, and thus for brake pressure to be built up and also (jointly) controlled at the wheel brakes 8a-8d (4-wheel braking).

The activatability of the axle separation valve 40 makes it possible for different pressures to be set on an axle-by-axle basis. This is performed, for example, in accordance with an axle multiplex method. For this purpose, use may also be made of the driving dynamics data of the sensor system 60, which is assigned to the first electrical device 100. Accordingly, the locking sequence of the axles can be adhered to, and an undesired destabilization in the event of relatively intense decelerations can be avoided.

The performance of this control strategy (case c)) is duly not at the level of the fault-free system in terms of braking performance. However, it is sufficient, for the described fault situation, to ensure the residual function.

FIG. 3 schematically illustrates a third exemplary embodiment of a brake system according to an aspect of the invention for a motor vehicle having four hydraulically actuatable wheel brakes 8a, 8b, 8c, 8d. By way of example, the wheel brake 8a is assigned to the left rear wheel (RL), the wheel brake 8b is assigned to the right rear wheel (RR), the wheel brake 8c is assigned to the left front wheel (FL), and the wheel brake 8d is assigned to the right front wheel (FR). The wheel brakes 8a, 8b are thus assigned to the rear axle HA and the wheel brakes 8c, 8d are assigned to the front axle VA.

The brake system comprises a simulation device 3 which is actuatable by means of a brake pedal 1, a first electrically controllable pressure provision device 5, a second electrically controllable pressure provision device 2, a pressure medium reservoir 4 which is under atmospheric pressure, wheel-specific brake pressure modulation valves, which in the example are designed as one inlet valve 6a-6d and one outlet valve 7a-7d per wheel brake, a first electronic open-loop and closed-loop control unit 12, and a second electronic open-loop and closed-loop control unit 112. The electronic open-loop and closed-loop control units serve, for example, for activating the electrically actuatable components of the brake system, for supplying energy to electrical components of the brake system and/or for evaluating signals of sensors of the brake system or of surroundings sensors, as will be discussed in more detail below.

The simulation device 3 has, in a housing, a simulator piston 31 which is supported on the housing by means of an elastic element 33 (for example simulator spring) which is arranged in a simulator rear chamber 30. A piston rod 24 couples the pivoting movement of the brake pedal 1 resulting from a pedal actuation to the translational movement of the simulator piston 31, the actuation travel of which is detected by a travel sensor 25, which is preferably of redundant design. In this way, the corresponding piston travel signal is a measure of the brake pedal actuation angle. It represents a braking demand of a vehicle driver. For the detection of the driver demand, a further sensor 20 is provided, which detects a physical variable which is independent of the piston travel of the simulator piston 31 and which characterizes the braking demand of the vehicle driver. This may for example be a force sensor or a pressure sensor.

The first electrically controllable pressure provision device 5 is in the form of a hydraulic cylinder-piston arrangement (or a single-circuit electrohydraulic actuator (linear actuator)), the piston 36 of which can be actuated, in particular advanced and retracted, in order to build up and dissipate a pressure in a pressure chamber 37, by a schematically indicated electric motor 35 via a likewise schematically illustrated rotation-translation mechanism 39. The piston 36 delimits the pressure chamber 37 of the pressure provision device 5. For the activation of the electric motor, a rotor position sensor 44 is provided, which detects the rotor position of the electric motor 35 and which is merely schematically indicated.

A system pressure line portion 38 is connected to the pressure chamber 37 of the first electrically controllable pressure provision device 5. The line portion 38 is connected via an electrically actuatable first separation valve 26, which is preferably normally closed, to a brake supply line 13, via which all of the input ports of the inlet valves 6a-6d are connected to the pressure chamber 37 of the first electrically controllable pressure provision device 5. By means of the first separation valve 26, the hydraulic connection between the pressure chamber 37 of the first electrically controllable pressure provision device 5 and the brake supply line 13 (and thus the input ports of the inlet valves 6a-6d) can be opened and shut off in controlled fashion.

The pressure chamber 37 is connected via a (replenishment) line 42 to the pressure medium reservoir 4 irrespective of the state of actuation of the piston 36. A check valve 53 which closes in the direction of the pressure medium reservoir 4 is arranged in the line 42. A replenishment of pressure medium into the pressure chamber 37 is thus possible by means of a retraction of the piston 36 whilst the separation valve 26 is closed. The cylinder-piston arrangement 5 has no snifter bores.

The first pressure provision device 5 is a high-performance pressure actuator that realizes the normal brake function with an extremely high level of comfort and extremely high dynamics in the fault-free brake system.

The second electrically controllable pressure provision device 2 is advantageously designed as a two-circuit radial piston pump whose two pressure sides are interconnected. A single-circuit radial piston pump is likewise conceivable. It has a suction port 28, which is connected via a hydraulic connection 41 to the pressure medium reservoir 4, and a pressure port 27. The pressure port 27 of the second pressure provision device 2 is connected to the brake supply line 13, so that the input ports of the inlet valves 6a-6d are connected to the pressure port 27 of the second pressure provision device 2.

The second pressure provision device 2 is firstly assigned an overflow valve 32, the activation of which can realize a pressure limitation and pressure dissipation. For this purpose, the pressure port 27 of the second pressure provision device 2 is connected via the overflow valve 32 to the suction port 28 and thus to the pressure medium reservoir 4. The overflow valve 32 is of normally-open design, and advantageously designed to be controllable in analog fashion. By means of the overflow valve 32, the pressure provided by the second pressure provision device 2 for the wheel brakes can be limited or dissipated.

For example, between the second pressure provision device 2 and the pressure medium reservoir 4, there is arranged a parallel circuit of the normally-open overflow valve 32, which is controllable in analog fashion, and a check valve 63 which closes toward the pressure medium reservoir 4.

The second pressure provision device or piston pump 2 is furthermore assigned a (second) separation valve 23, which is arranged hydraulically in series with respect to the overflow valve 32.

The separation valve 23 can be closed as required in order to prevent a pressure dissipation/pressure medium outflow via the overflow valve 32 of the second pressure provision device 2 into the pressure medium reservoir 4.

In the exemplary embodiment of FIG. 3, the separation valve 23 is arranged hydraulically in series with respect to the second pressure provision device 2. Correspondingly, the second pressure provision device 2 is hydraulically connected via the (second) separation valve 23 to the brake supply line 13 or to the first line portion 13a.

In an alternative exemplary embodiment which is not illustrated, the (second) separation valve 23 is arranged hydraulically in parallel with respect to the second pressure provision device 2.

As already mentioned, the brake system comprises, for each hydraulically actuatable wheel brake 8a-8d, an inlet valve 6a-6d and an outlet valve 7a-7d which are hydraulically interconnected in pairs via central ports and are connected to the wheel brake 8a-8d. Connected in parallel with respect to each of the inlet valves 6a-6d is a check valve (not designated specifically) which opens in the direction of the brake supply line 13. The outlet ports of the outlet valves 7a-7d are connected to the pressure medium reservoir 4 via a common return line 14. The input ports of all inlet valves 6a-6d can be supplied via the brake supply line 13 with a pressure which is provided by the first pressure provision device 5 or, for example in the event of a failure of the first pressure provision device, by the second pressure provision device 2.

In the brake supply line 13 there is arranged an electrically actuatable, advantageously normally-open axle separation valve 40 by means of which the brake supply line 13 can be separated into a first line portion 13a, which is connected (in the example via the second separation valve 23) to the second pressure provision device 2, and a second line portion 13b, which is connected (in the example via the first separation valve 26) to the first pressure provision device 5. Here, the first line portion 13a is hydraulically connected to two of the inlet valves, specifically the inlet valves 6a and 6b, and the second line portion 13b is hydraulically connected to the other inlet valves, specifically the inlet valves 6c and 6d. By closing the circuit separation valve 40, the brake system is thus hydraulically separated or divided into two (partial) brake circuits I and II. Here, in the first brake circuit I, the second pressure provision device 2 is connected to only the wheel brakes 8a and 8b of the rear axle, and in the second brake circuit II, the first pressure provision device 5 is connected to only the wheel brakes 8c and 8d of the front axle.

The brake system comprises, for each brake circuit I and II, a pressure sensor: a first pressure sensor 19, which is assigned to the first pressure provision device 5, and a second pressure sensor 49, which is assigned to the second pressure provision device 2. The pressure sensors are advantageously connected close to the respective pressure provision device, which is advantageous for operation and self-diagnosis.

In the example, the brake system comprises, for leakage monitoring purposes, a level-measuring device 50 for determining a pressure medium level in the pressure medium reservoir 4.

In the example, the brake system comprises in each case one electric parking brake (EPB) at the wheels of the rear axle HA. Said parking brake may be integrated into the hydraulic wheel brakes, being a so-called integrated electric parking brake (IPB).

Each wheel is assigned, for example, a first wheel speed sensor and an independent second wheel speed sensor (or a redundant wheel speed sensor) (not shown in detail in FIG. 3) whose signals are required for brake control functions with wheel-specific brake pressures, for example for antilock control functions (ABS). The first wheel speed sensors are schematically illustrated as block 56, and the second wheel speed sensors are schematically illustrated as block 66.

Furthermore, the brake system is connected to, or comprises, a driving dynamics sensor system 60.

In the example, the components 2, 5, 6a-6d, 7a-7d, 32, 23, 40 and 26 are arranged in a first module, for example in a first hydraulic open-loop and closed-loop control unit HCU1, whilst the simulation device 3 with the sensors 25, 20 is implemented in a separate, second module 200.

The first electronic open-loop and closed-loop control unit (ECU) 12 is assigned to the hydraulic open-loop and closed-loop control unit HCU1, which is illustrated highly schematically. The first module (HCU) and first ECU 12 are advantageously designed in known manner as a first electrohydraulic unit (HECU).

The module 200 of the simulation device 3 is assigned its own, the second electronic open-loop and closed-loop control unit (ECU) 112. These preferably form a second unit.

Alternatively, an arrangement of the components 2, 3, 5, 6a-6d, 7a-7d, 32, 23, 40 and 26 in a common module, that is to say in a common hydraulic open-loop and closed-loop control unit (HCU) is also conceivable. It is then possible for one electronic open-loop and closed-loop control unit (ECU) or multiple electronic open-loop and closed-loop control units (ECU) to be assigned.

To supply the brake system with electrical energy, a first electrical energy source 57, for example a vehicle electrical system, and a second electrical energy source 67, for example a vehicle electrical system, which is independent of the first energy source are provided. The first electrical energy source 57 supplies the electrical partition A with energy and the second electrical energy source 67 the electrical partition B.

For the activation of the brake system, there are a first electrical device 100 with electrical and/or electronic elements (for example microcontrollers, power components, valve drivers, other electronic components, etc.), which first electrical device is assigned or belongs to the first electrical partition A, and a second electrical device 110 with electrical and/or electronic elements (for example microcontrollers, power components, valve drivers, other electronic components, etc.), which second electrical device is assigned or belongs to the second electrical partition B. The first electrical device 100 and the second electrical device 110 or the electrical first partition A and the second electrical partition B are electrically independent.

The electrical and/or electronic elements of one of the electrical devices 100 or 110 are, in the example, distributed between the two electronic open-loop and closed-loop control units 12, 112. Accordingly, each of the electronic open-loop and closed-loop control units 12, 112 comprises two independent (electrically separate) printed circuit boards, wherein only elements of the first electrical device 100 are arranged on one printed circuit board and only elements of the first electrical device 110 are arranged on the other printed circuit board.

The ECU 12 comprises a part 100-*a* of the first electrical device 100 (partition A) and a part 110-*a* of the second electrical device 110 (partition B).

The part 100-*a* of the electrical device 100 is supplied by the first electrical energy source 57. The part 110-*a* of the electronics 110 is supplied by a second electrical energy source 67.

The part 100-*a* of the first electrical device 100 comprises, for example, the electrical and electronic components and valve coils for the activation of the valves 23, 26 and 40 (partition A). Said part furthermore comprises the electrical and electronic components for the activation of the electric motor 35 of the first pressure provision device 5 (partition A). For this purpose, the part 100-*a* of the first electrical device 100 in ECU 12 also comprises the electrical and electronic components for signal processing or evaluation of the sensor 44 of the electric motor 35 of the first pressure provision device 5 (partition A).

Preferably, the valves 23, 26 and 40 are equipped with a single activation coil, so that the valves 23, 26 and 40 can be activated only by the first electrical device 100 (partition A).

The part 100-*a* of the first electrical device 100 in ECU 12 furthermore comprises the electrical and electronic components for signal processing or evaluation of the pressure sensor 19 for the first pressure provision device 5.

The signals of the (first) wheel speed sensors 56 are fed to the first electrical device 100 or to the part 100-*a* of the first electrical device 100 in ECU 12.

The signal of a human-machine interface (HMI) 55, for example a switch, for activating or deactivating a driving dynamics control function (ESC) or the like is fed to the first electrical device 100 or the part 100-*a* of the first electrical device 100 in ECU 12. In a manner dependent on this, in the part 100-*a* of the electrical device 100, the signals of the driving dynamics sensor system 60 are evaluated and taken into consideration for the pressure actuation.

The part 110-*a* of the second electrical device 110 in ECU 12 comprises the electrical and electronic components for activating the electric motor of the second pressure provision device 2. Said part furthermore comprises the electrical and electronic components and valve coils for activating the valve 32 and the wheel pressure control valves 6*a*-6*d* and 7*a*-7*d*. Conventional valves with a single activation coil are preferably used, so that the valves 6*a*-6*d* and 7*a*-7*d* (and 32) are activatable only by the second electrical device 110 (partition B).

The part 110-*a* of the second electrical device 110 in ECU 12 furthermore comprises the electrical and electronic components for signal processing or evaluation of the pressure sensor 49 for the second pressure provision device 2.

The part 110-*a* of the second electrical device 110 in ECU 12 furthermore comprises electrical and electronic components for activating the electric parking brakes (IPB) of the rear axle HA. Corresponding activation lines 70 are indicated in FIG. 3.

In the example, the signal of a human-machine interface 54 (HMI), for example a switch, for actuating the electric parking brake (IPB, EPB) which is arranged at the wheels of the rear axle HA is fed to the part 110-*a* of the second electrical device 110 or to the second electrical device 110.

In the example, the signals of the (for example four) second wheel speed sensors 66 are provided to the second electrical device 110 or to the part 110-*a*.

The part 110-*a* of the second electrical device 110 in ECU 12 is connected to a data bus 68, for example a CAN bus.

The part 100-*a* of the first electrical device 100 in ECU 12 is connected to a data bus 58, for example a CAN bus.

The first and the second data bus 58, 68 are advantageously independent of one another.

As already mentioned, one part 100-*b* of the electronics in ECU 112 belongs to the first electrical device 100, another part 110-*b* of the electronics in ECU 112 belongs to the second electrical device 110. Correspondingly, the part 100-*b* of the first electrical device 100 in ECU 112 (partition A) is supplied by the first electrical energy source 57 and the part 110-*b* of the second electrical device 110 in ECU 112 (partition B) is supplied by the second electrical energy source 67.

Likewise, the part 100-*b* of the first electrical device 100 in ECU 112 is connected to the data bus 58, whereas the part 110-*b* of the second electrical device 110 in ECU 112 is connected to the data bus 68.

The part 100-*b* of the first electrical device 100 comprises the electrical and electronic components for signal processing or evaluation of the force or pressure sensor 20.

The part 110-*b* of the second electrical device 110 comprises the electrical and electronic components for signal processing or evaluation of the travel sensor 25.

In the example, the part 100-*b* of the first electrical device 100 in ECU 112 is, for the transmission of the signals of sensor 20, connected (71) directly via a signal connection line or communication connection line 71 to the part 100-*a* of the first electrical device 100 in ECU 12.

The first pressure provision device 5 and the axle separation valve 40 are thus assigned to the first electrical partition A or device 100. Furthermore, in the example, the separation valve 26 and the separation valve 23 are assigned to the first partition or electrical device.

Furthermore, it is advantageously the case that one of the sensors 20, 25 for braking demand detection, the sensor 20 in the example, is assigned to the first electrical device 100.

In the example, the parts 100-*a*, 100-*b* of the first electrical device 110 are connected to one another via the data bus 58, since they are arranged spatially in different ECUs.

The second pressure provision device 2 and the inlet and outlet valves 6*a*-6*d*, 7*a*-7*d* are thus assigned to the second electrical partition B or device 110. Furthermore, in the example, the overflow valve 32 is assigned to the second partition or device.

Furthermore, the other sensor (in the example the sensor 25) of the sensors 20, 25 for braking demand detection is advantageously assigned to the second electrical device 110.

In the example, the parts 110-*a*, 110-*b* of the second electrical device 110 are connected to one another via the data bus 68, since they are arranged spatially in different ECUs.

The second separation valve 23 of the second pressure provision device 2 (partition B) is activated by the first electrical device 100 (partition A). In the event of failure of the secondary energy supply 67 or of the second electrical device 110, the normally-open valve 23 can thus be closed in order to prevent a dissipation of pressure via the overflow valve 32 of the secondary pressure source.

The release of pressure from the system in the released position is ensured by means of the two described normally-open valves 32, 23. In particular, a conventional linear actuator without snifter bore may be used as primary pressure source 5, and the first separation valve 26 between linear actuator 5 and brake supply line 13 may be a conventional normally-closed valve.

In order to be able to build up and reduce pressure in the event of failure of the second energy supply 67 or of the second electrical device 110 (failure in partition B), the separation valve 26 is activated by the first electrical device 100 (partition A). By contrast, in the event of failure of the first energy supply 57 or of the first electrical device 100, the normally-closed position of the separation valve 26 is the more advantageous position.

The two units made up of in each case hydraulic and/or mechanical unit HCU1 and/or 200 and electronic open-loop and closed-loop control unit 12, 112 are preferably mounted on the bulkhead or the chassis, this being schematically indicated by the block 59 in FIG. 3.

Exemplary methods for the operation of the brake system will be described below:

a) Failure in partition A, for example failure of the first pressure provision device 5, the first electrical device 100 or the first energy source 57:

Since the second electrical device 110 activates the second pressure provision device 2 and the overflow valve 32, brake pressure can be built up and also (jointly) controlled at all wheel brakes (4-wheel braking).

Wheel-specific pressure control operations, in particular anti-lock control operations, are also possible by means of the inlet and outlet valves 6a-6d, 7a-7d, because these are activated by the second electrical device 110, and the signals of the wheel speed sensors 66 are available to the second electrical device 110.

Thus, the second electrical partition B can, in a virtually unchanged manner in relation to that which is known, perform ABS control (ABS: anti-lock system) and realize all residual functions together with the possibility of building up brake pressure.

b) Failure in partition B, for example failure of the second pressure provision device 2, the second electrical device 110 or the second energy source 67:

Since the first electrical device 100 activates the first pressure provision device 5, the axle separation valve 40 and the first and the second separation valve 26, 23, it is possible, through activation of the pressure provision device 5, opening of the separation valve 26 and closing of the separation valve 23, for the first pressure provision device 5 to be connected to all wheel brakes 8a-8d, and thus for brake pressure to be built up and also (jointly) controlled at the wheel brakes 8a-8d (4-wheel braking).

The activatability of the axle separation valve 40 makes it possible for different pressures to be set on an axle-by-axle basis. This is performed, for example, in accordance with an axle multiplex method. For this purpose, use is made of the driving dynamics data of the sensor system 60, which is assigned to the first electrical device 100. Accordingly, the locking sequence of the axles can be adhered to, and an undesired destabilization in the event of relatively intense decelerations can be avoided.

The performance of this control strategy (case b)) is duly not at the level of the fault-free system in terms of braking performance. However, it is sufficient, for the described fault situation, to ensure the residual function.

Figure 4:
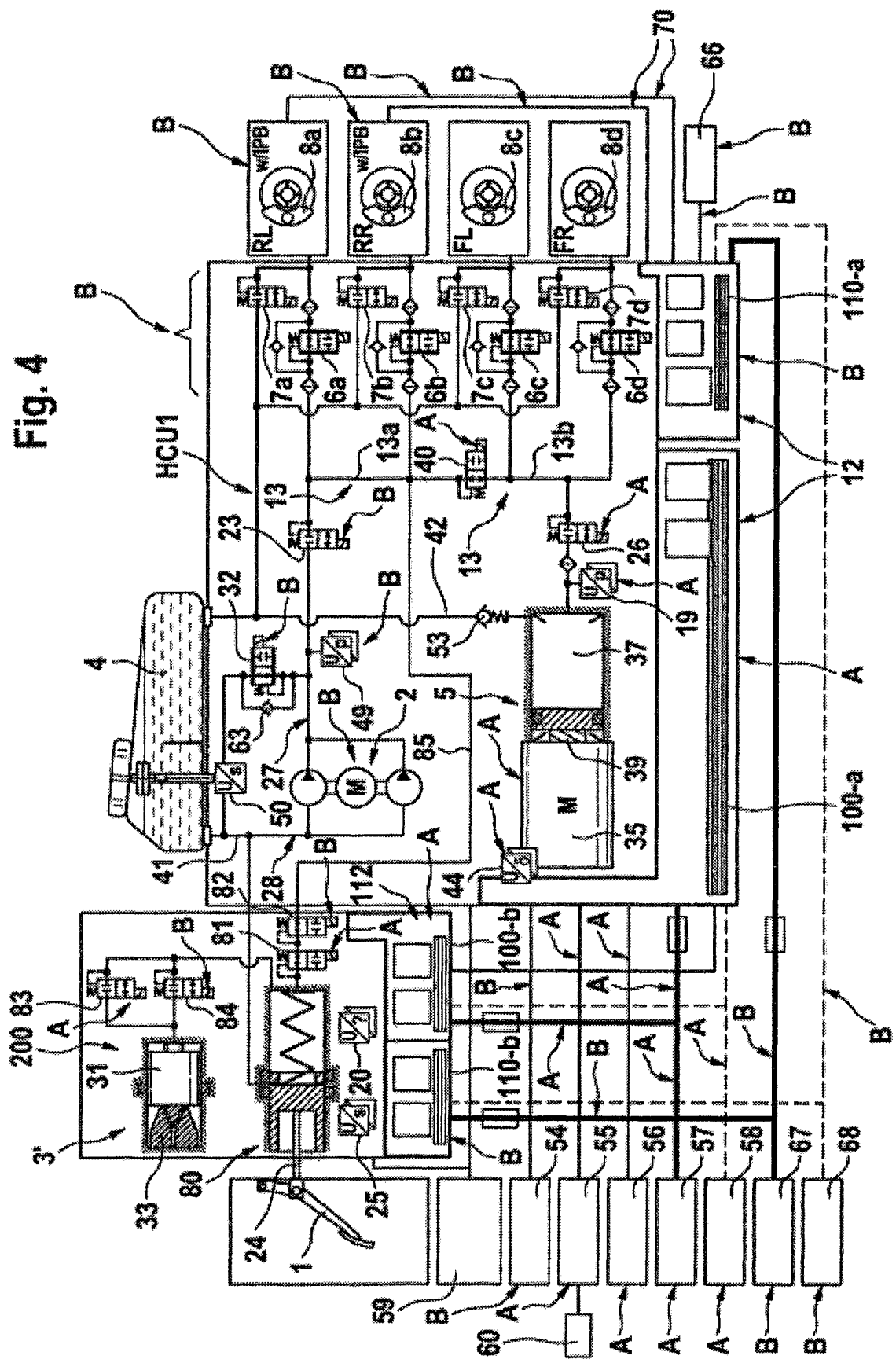
FIG. 4 shows a fourth exemplary embodiment of a brake system according to an aspect of the invention.

FIG. 4 shows a fourth exemplary embodiment of a brake system according to an aspect of the invention. The fourth exemplary embodiment substantially corresponds to the third exemplary embodiment of FIG. 3. The differences will therefore be described below.

The second separation valve 23 of the second pressure provision device 2 is of normally-closed design. Said second separation valve belongs to the second electrical partition B and is (like the overflow valve 32) activated or supplied with energy, in particular exclusively, by the second electrical device 110.

The fourth exemplary embodiment differs from the third exemplary embodiment of FIG. 3 furthermore in that a brake-pedal-actuated, single-circuit master brake cylinder 80 and a hydraulic simulation device 3' connected to the master brake cylinder 80 are provided instead of the brake-pedal-actuated simulation device 3. The master brake cylinder 80 is connected via a line 85 to the brake supply line 13, advantageously to the first line portion 13a.

A third separation valve 81 and a fourth separation valve 82 connected downstream of the third separation valve are arranged between master brake cylinder 80 and brake supply line 13. The valves 81, 82 are connected in series. The third and fourth separation valves 81, 82 are of normally-open design.

In the example, the separation valve 81 belongs to the first partition A and is activated by the first electrical device 100, in particular the part 100-b in ECU 112, whereas the separation valve 82 belongs to the second partition B and is activated by the second electrical device 110, in particular the part 110-b in ECU 112. A reversed assignment/activation is likewise possible.

A first simulator enable valve 83 and a second simulator enable valve 84 are arranged between master brake cylinder 80 and simulation device 3'. The valves 83, 84 are connected in parallel. The valves 83, 84 are of normally-closed design.

In the example, the simulator enable valve 83 belongs to the first partition A and is activated by the first electrical device 100, in particular the part 100-b in ECU 112, whereas the simulator enable valve 83 belongs to the second partition B and is activated by the second electrical device 110, in particular the part 110-b in ECU 112. A reversed assignment/activation is likewise possible.

Correspondingly, the part 100-b of the first electrical device 100 in ECU 112 comprises the electrical and electronic components and valve coils for the activation of the valves 81 and 83. The part 110-b of the second electrical device 110 in ECU 112 comprises the electrical and electronic components and valve coils for the activation of the valves 82 and 84.

The brake system according to the fourth exemplary embodiment thus comprises an additional hydraulic intervention (by the driver) as a second fallback level in the event of a double fault, for example a failure of the first and second pressure provision devices 2, 5.

In all exemplary embodiments, the first electrical partition A (that is to say the first electrical device 100, the first energy supply 57 and the components connected to or the components activated by said first electrical partition) and the second electrical partition B (second electrical device 110, second energy supply 67 and the components connected to or the components activated by said second electrical partition) are electrically independent.

A particular feature of the exemplary brake systems of FIGS. 1 to 4 is the asymmetry, wherein an electrical partition B can, by means of eight wheel pressure modulator valves (inlet valves 6a-6d and outlet valves 7a-7d) and a pressure provision device 2, perform 4-wheel braking operations and wheel-specific pressure control operations even after a failure in the other electrical partition A, for example of the first electrical device 100 or of the electrical energy source 57 thereof, and another, independent electrical partition A can, by means of another pressure provision device 5 and at least one axle separation valve 40 (and possibly further valves), perform 4-wheel braking operations and axle-specific pressure control operations even after a failure in the partition B, for example of the second electrical device 110 or of the electrical energy source 67 thereof.

The exemplary brake systems comprise a primary (5) and a secondary (2) pressure provision device, a single wheel pressure modulation group 6a-6d, 7a-7d and at least one axle separation valve 40.

The exemplary brake systems offer the redundancy necessary for the realization of highly automated driving functions, in order to implement autonomous braking requirements. Even after a serious fault, such as a failure of the first energy supply 57 of the partition A or of the first pressure provision device 5, the brake system is able to continue to implement certain residual braking functions autonomously or in a manner controlled by an autopilot. The most important residual braking functions of the brake system are:
  building up deceleration;
  adhering to the locking sequence of the axles and avoiding undesired destabilization in the event of relatively intense decelerations;
  maintaining steerability in order to enable the autopilot or driver to perform evasive maneuvers even under braking.

One expensive solution for providing a brake system architecture which can realize the residual functions to an adequate extent even after severe faults in parts of the system or of the vehicle would be to provide substantially symmetrical redundancy in the brake system components, in the case of which all of the components required for realizing the residual function are provided in redundant (that is to say duplex) fashion. Furthermore, it is often the case here that the redundant parts perform no particular function in the fault-free state, but must be monitored and constitute additional components which themselves lead to failures, which fundamentally reduces the availability of the fault-free state.

An aspect of the invention offers the advantage that the number of redundant components is kept as small as possible. Neither the inlet and outlet valves for the wheel-specific brake pressure control nor the sensors for wheel-specific brake pressure control functions (such as anti-lock control, driving dynamics control etc.) are of redundant form.

The wheel pressure control actuators (for example valve coils of the inlet and outlet valves) and sensors used in the system are advantageously partitioned with the two redundant pressure provision devices 2, 5 by virtue of the non-redundant components being distributed between the two redundant pressure provision devices 2, 5 such that, in the event of failure of one redundant pressure provision device, the remaining pressure provision device can, with the aid of the components assigned thereto, continue to ensure the primary functions. Here, the failure of a pressure provision devices refers to the various fault possibilities, such as for example failure of a redundant electrical supply, of a redundant processing unit or of a redundant hydraulic pressure provider.

Here, the control strategy is advantageously adapted to the respectively remaining actuators and sensors.

The invention claimed is:

1. A brake system for a motor vehicle, comprising:
  hydraulically actuatable wheel brakes which are assigned to wheels of a first vehicle axle and wheels of a second vehicle axle,
  an electrically actuatable inlet valve and electrically actuatable outlet valve for each wheel brake for setting wheel-specific brake pressures,
  a first electrically controllable pressure provision device which is connected to a brake supply line to which the wheel brakes are connected,
  a second electrically controllable pressure provision device which is connected to the brake supply line,
  a first electrical device with electrical and/or electronic elements, which activates the first pressure provision device,
  a second electrical device with electrical and/or electronic elements, which activates the second pressure provision device,
  a first electrical partition and a second electrical partition which are electrically independent of each other, and
  at least one electrically actuatable axle separation valve which is arranged hydraulically in the brake supply line between the wheel brakes for the wheels of the first vehicle axle and the wheel brakes for the wheels of the second vehicle axle, the axle separation valve being a normally-open valve,
  wherein the first pressure provision device and the first electrical device are assigned to the first electrical partition and the second pressure provision device, the second electrical device and the inlet and outlet valves are assigned to the second electrical partition, wherein the inlet and outlet valves are activated by the second electrical device, and wherein the axle separation valve is assigned to the first electrical partition and is activated by the first electrical device.

2. The brake system as claimed in claim 1, wherein the first pressure provision device is activated exclusively by the first electrical device and the second pressure provision device and the inlet and outlet valve are activated exclusively by the second electrical device.

3. The brake system as claimed in claim 1, wherein the axle separation valve is activated exclusively by the first electrical device.

4. The brake system as claimed in claim 3, wherein the axle separation valve is arranged such that, when the axle separation valve is closed, the brake supply line is hydraulically separated into a first line portion and a second line portion, wherein the first line portion is connected to the second pressure provision device and to the inlet valves of the wheel brakes of the rear axle of the motor vehicle, and the second line portion is connected to the first pressure provision device and to the inlet valves of the wheel brakes of the front axle of the motor vehicle.

5. The brake system as claimed in claim 1, wherein the axle separation valve is arranged such that, when the axle separation valve is closed, the brake supply line is hydraulically separated into a first line portion and a second line portion, wherein the first line portion is connected to the second pressure provision device and to the inlet valves of the wheel brakes of the rear axle of the motor vehicle, and the second line portion is connected to the first pressure provision device and to the inlet valves of the wheel brakes of the front axle of the motor vehicle.

6. The brake system as claimed in claim 5, wherein, when the axle separation valve is closed, the brake system is separated into two hydraulic brake circuits, wherein in the first hydraulic brake circuit, the second pressure provision device is hydraulically connected to only the wheel brakes of the rear axle, and in the second hydraulic brake circuit, the first pressure provision device is hydraulically connected to only the wheel brakes of the front axle.

7. The brake system as claimed in claim 1, wherein the first electrical device is supplied by a first electrical energy source and the second electrical device is supplied by a second electrical energy source, which is independent of the first electrical energy source.

8. The brake system as claimed in claim 1, wherein a first wheel speed sensor is provided for each of the wheel brakes, wherein the first wheel speed sensors are assigned to the second electrical partition and are connected to the second electrical device and are evaluated by the latter.

9. The brake system as claimed in claim 1, wherein a first driving dynamics sensor system is provided which is assigned to the first electrical partition and which is connected to the first electrical device and is evaluated by the latter.

10. The brake system as claimed in claim 1, wherein a normally-open overflow valve, which is controllable in analog fashion, is provided for the adjustment or control of the pressure provided by the second pressure provision device, which overflow valve is assigned to the second electrical partition and is activated by the second electrical device.

11. The brake system as claimed in claim 10, wherein the second pressure provision device is formed by a piston pump with a suction port and a pressure port, wherein the pressure port is hydraulically connected via the overflow valve to the suction port.

12. A method for operating a brake system as claimed in claim 1, wherein in a fault-free state of the brake system, the first electrical device performs an actuation of the wheel brakes by the first pressure provision device, wherein the second electrical device sets wheel-specific wheel brake pressures by the inlet and outlet valves.

13. The method as claimed in claim 12,
wherein in the event of a failure in the second electrical partition, the first electrical device performs a braking operation with axle-specific wheel brake pressures by the first pressure provision device and the axle separation valve.

14. The method as claimed in claim 13, wherein the axle brake pressure at the rear axle is kept constant, whilst the axle brake pressure at the front axle is modulated.

15. A method for operating a brake system as claimed in claim 1, wherein in the event of a failure in the first electrical partition, the second electrical device performs a braking operation with wheel-specific wheel brake pressures by the second pressure provision device and the inlet and outlet valves.

* * * * *